United States Patent
Wright et al.

(10) Patent No.: US 6,167,796 B1
(45) Date of Patent: Jan. 2, 2001

(54) BAKER FOR WAFFLES, PANCAKES AND SIMILAR FOOD ITEMS

(75) Inventors: Irvin E. Wright, Fountain Valley, CA (US); Rodney L. Osborne, Hebron; Paul E. George, II, Powell, both of OH (US)

(73) Assignee: New Carbon Company, Inc., South Bend, IN (US)

( * ) Notice: Under 35 U.S.C. 154(b), the term of this patent shall be extended for 0 days.

(21) Appl. No.: 09/373,454

(22) Filed: Aug. 12, 1999

Related U.S. Application Data

(60) Provisional application No. 60/108,042, filed on Nov. 12, 1998.

(51) Int. Cl.[7] .............................. A47J 37/00; A21B 1/00
(52) U.S. Cl. .............................. 99/332; 99/337; 99/344; 99/372; 99/373; 99/377; 99/378; 99/380
(58) Field of Search .............................. 99/326–334, 339, 99/337, 340, 344, 372–384, 385, 389–391, 400, 401, 444–446; 219/521

(56) References Cited

U.S. PATENT DOCUMENTS

| | | | |
|---|---|---|---|
| 1,609,317 | * 12/1926 | Smith | 99/377 |
| 1,708,499 | * 4/1929 | Filbey | 99/377 |
| 1,879,010 | * 9/1932 | Antrim | 99/377 |
| 1,954,235 | * 4/1934 | Becker | 99/378 X |
| 2,116,688 | * 5/1938 | Ratliff | 99/377 |
| 2,478,529 | * 8/1949 | Farr et al. | 219/524 X |
| 2,765,727 | * 10/1956 | Lipsich et al. | 219/525 X |
| 3,236,998 | * 2/1966 | Wertheimer et al. | 219/524 X |
| 3,245,337 | * 4/1966 | White et al. | 99/331 X |
| 3,377,942 | * 4/1968 | Carbon | 99/376 |
| 3,848,110 | * 11/1974 | Giguere et al. | 219/525 X |
| 3,852,569 | * 12/1974 | Potvin | 99/425 X |
| 4,027,139 | * 5/1977 | Theimer | 219/525 X |
| 4,075,940 | 2/1978 | Carbon . | |
| 4,531,048 | 7/1985 | Carbon . | |
| 4,803,918 | 2/1989 | Carbon et al. . | |

\* cited by examiner

*Primary Examiner*—Timothy F. Simone
(74) *Attorney, Agent, or Firm*—Baker & Daniels

(57) ABSTRACT

A waffle baker is disclosed which is of tubular frame construction having a pair of shell members which have a food receiving part, a handle, and a hinge. The shell members include a heater coil for connecting to a power source and a thermocouple to monitor the heat index of the shell members. A timing system is incorporated into the system, preferably through a magnetic and proximity switch, such that the baker turning and cooking time is monitored with either visual and/or audio warnings.

6 Claims, 17 Drawing Sheets

BAKER FOR WAFFLES, PANCAKES AND SIMILAR FOOD ITEMS

This application claims the benefit of U.S. Provisional Application Ser. No. 60/108,042, filed Nov. 12, 1998.

SUMMARY OF THE INVENTION

This invention relates to an improved baker for confectionary items such as waffles and pancakes.

Heretofore waffle bakers such as the type shown and described in U.S. Pat. No. 4,075,940, which is incorporated herein by reference, required at least some minimal skill of the user. In cooking a waffle for example, once the batter is placed within the lower shell of the baker and the upper shell closed over the batter, the cooking process immediately begins since the baker is already at its cooking temperature. Thus it is imperative that the baker user rotate the closed cooking shells so as to evenly distribute the batter within the interior of the baker and thereafter, either through the setting of an individual timer, the observing of a clock or just by guesswork, determine the proper cooking time in which to remove the food item. If the food item is removed too early it is undercooked; if it is removed too late it is overcooked. Even in those situations where a timer is provided for the user of the baker, it must be manually set for each cooking cycle which further introduces errors into the cooking cycle by either setting the timer too late or setting it at an improper cooking time.

In this invention a timing system is incorporated into the baker by which, through a unique switching system utilizing magnets and a proximity switch, the baker turning and cooking time is monitored with either visual and/or audio warnings being given to the user to prompt the user's course of action. Additionally, the improved baker of this invention includes a uniquely constructed shell member to base pivot connection in which a tubular member forming a part of the base extends into the pivot bracket or yoke to which the shell members are hinged so as to provide the journal by which the shell members when closed may be rotated 180° during the cooking cycle.

Accordingly, it is an object of this invention to provide a confectionary baker which is of simplified and reliable operation.

Another object of this invention is to provide a baker for waffles, pancakes and similar items and which is of simplified construction.

Other objects of this invention will become apparent upon a reading of the following description.

DESCRIPTION OF THE DRAWINGS

A preferred embodiment of this invention has been chosen wherein.

DESCRIPTION OF THE PREFERRED EMBODIMENT

Figure 1:
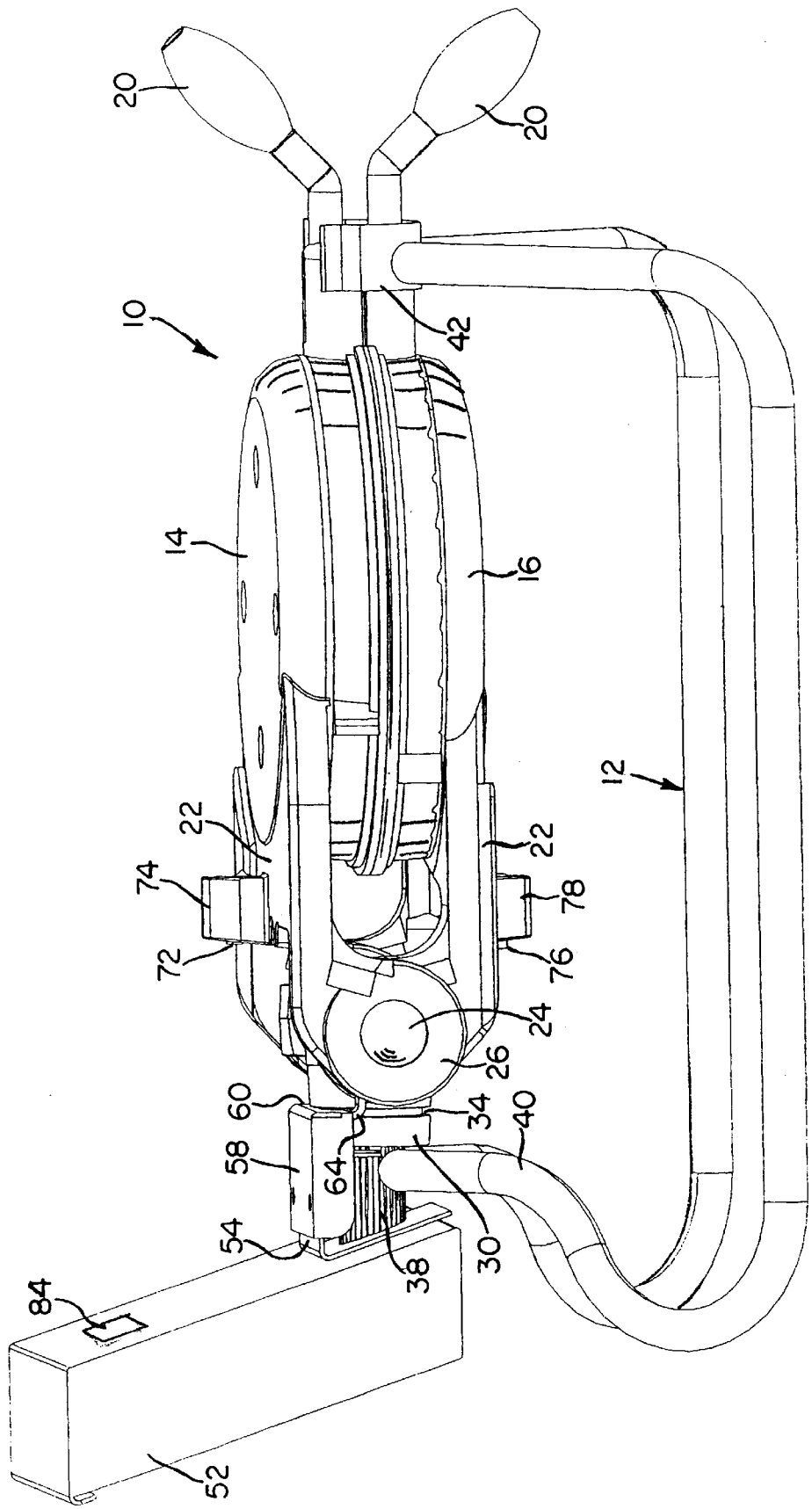
FIG. 1 is a perspective view taken from the side of the baker of this invention.
Figure 2:
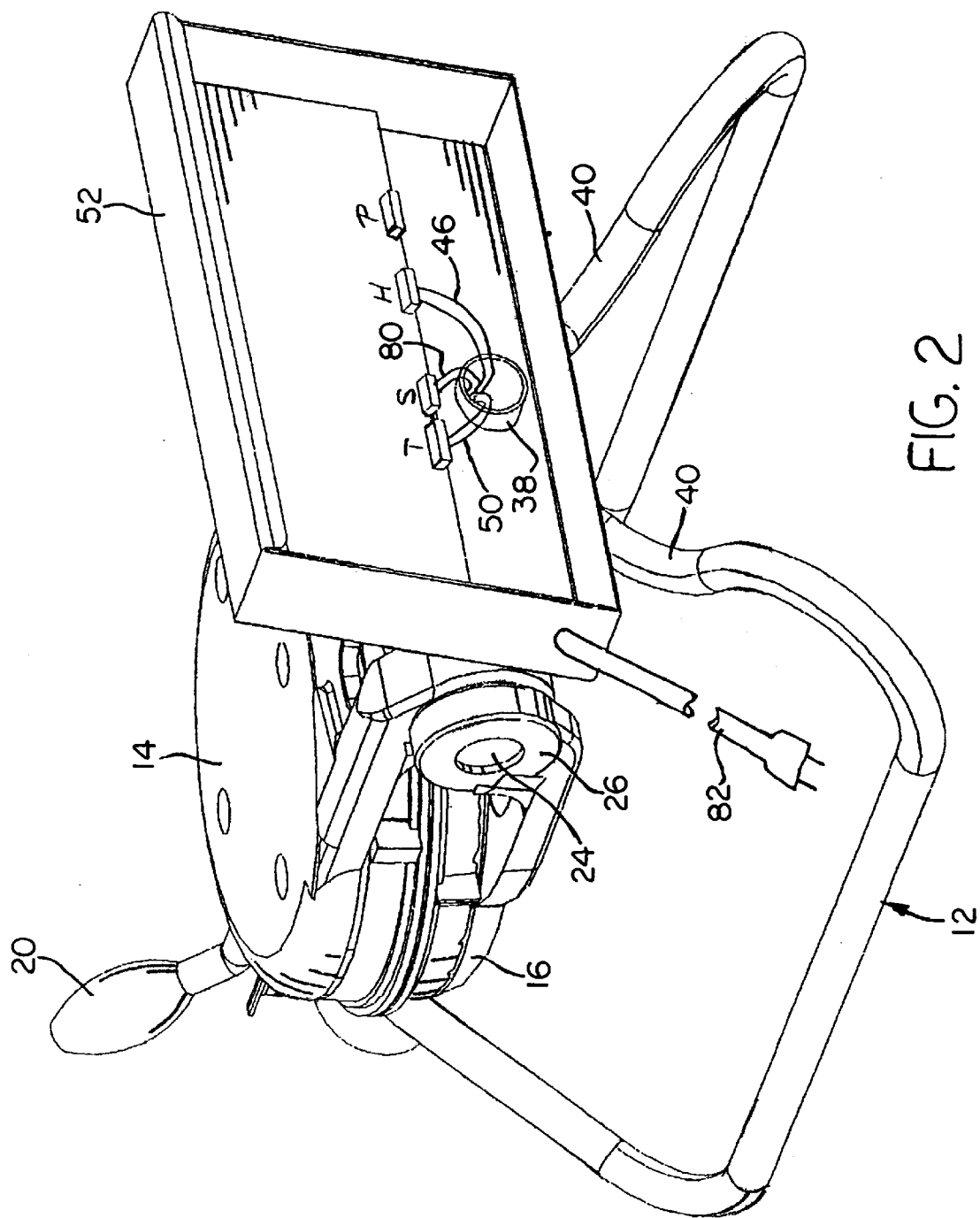
FIG. 2 is a perspective view as seen from the general rear of the baker.

The preferred embodiment illustrated is not intended to limit the invention to the precise form disclosed but rather is to enable others skilled in the art to best utilize the invention.

Baker 10 includes a base 12 which is of a tubular frame construction and a pair of shell members 14 and 16. Each of the shell members 14 and 16 includes a concave food receiving part 18, a handle 20 and a hinge part 22. Hinge part 22 of each shell member 14 and 16 includes a pintle 24 and a spaced coaxial eyelet 26. Shell members 14 and 16 are joined together for pivotal movement relative to each other by having pintle 24 of shell member 14 inserted through eyelet 26 of shell member 16 and pintle 24 of shell member 16 inserted into eyelet 26 of shell member 14. Thus far, the construction and manner of operation of baker 12 is very similar to that shown in U.S. Pat. No. 4,075,940.

Figure 3:
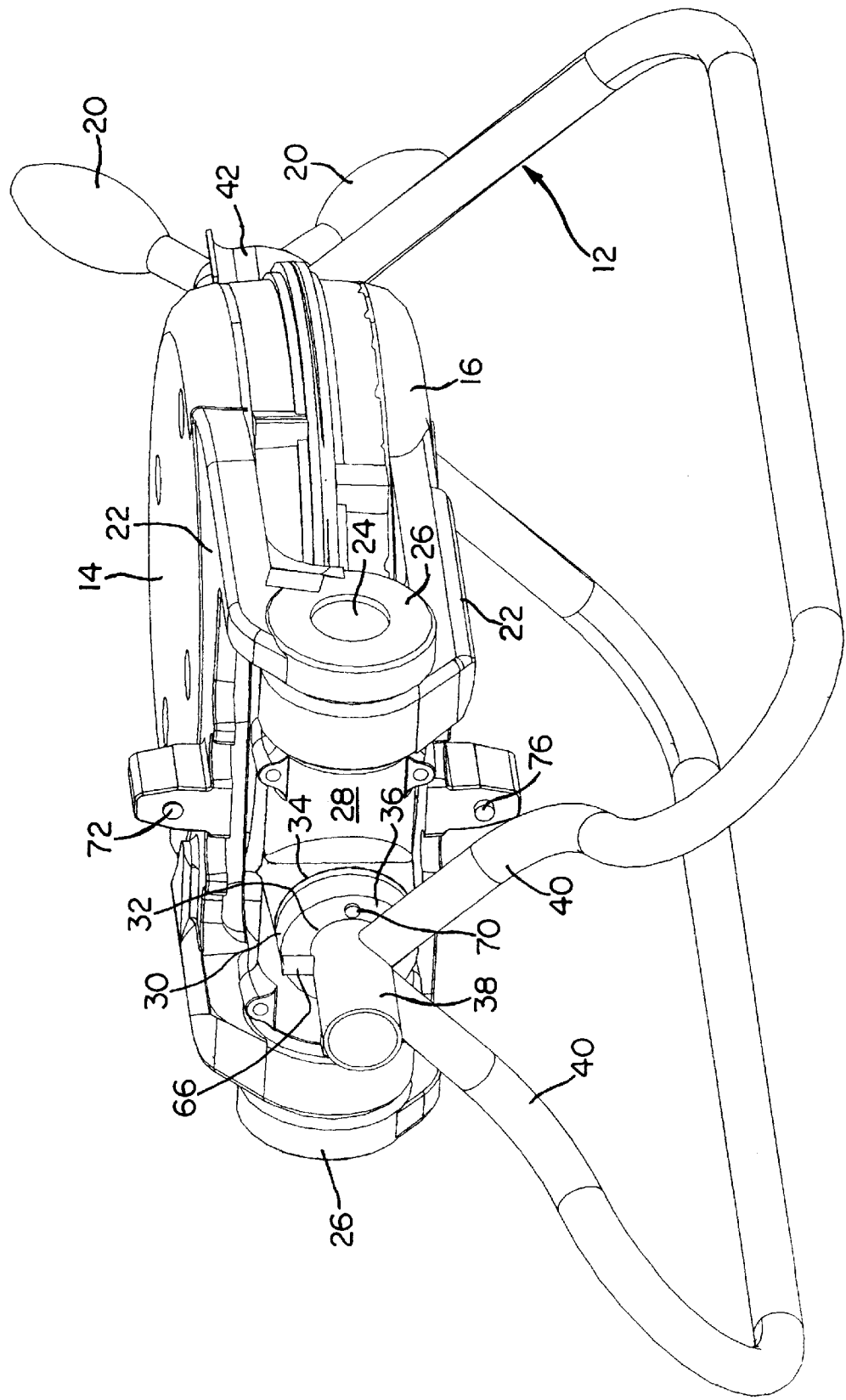
FIG. 3 is a perspective view taken from the general rear of the baker but with the control panel removed for purposes of illustration.
Figure 4:
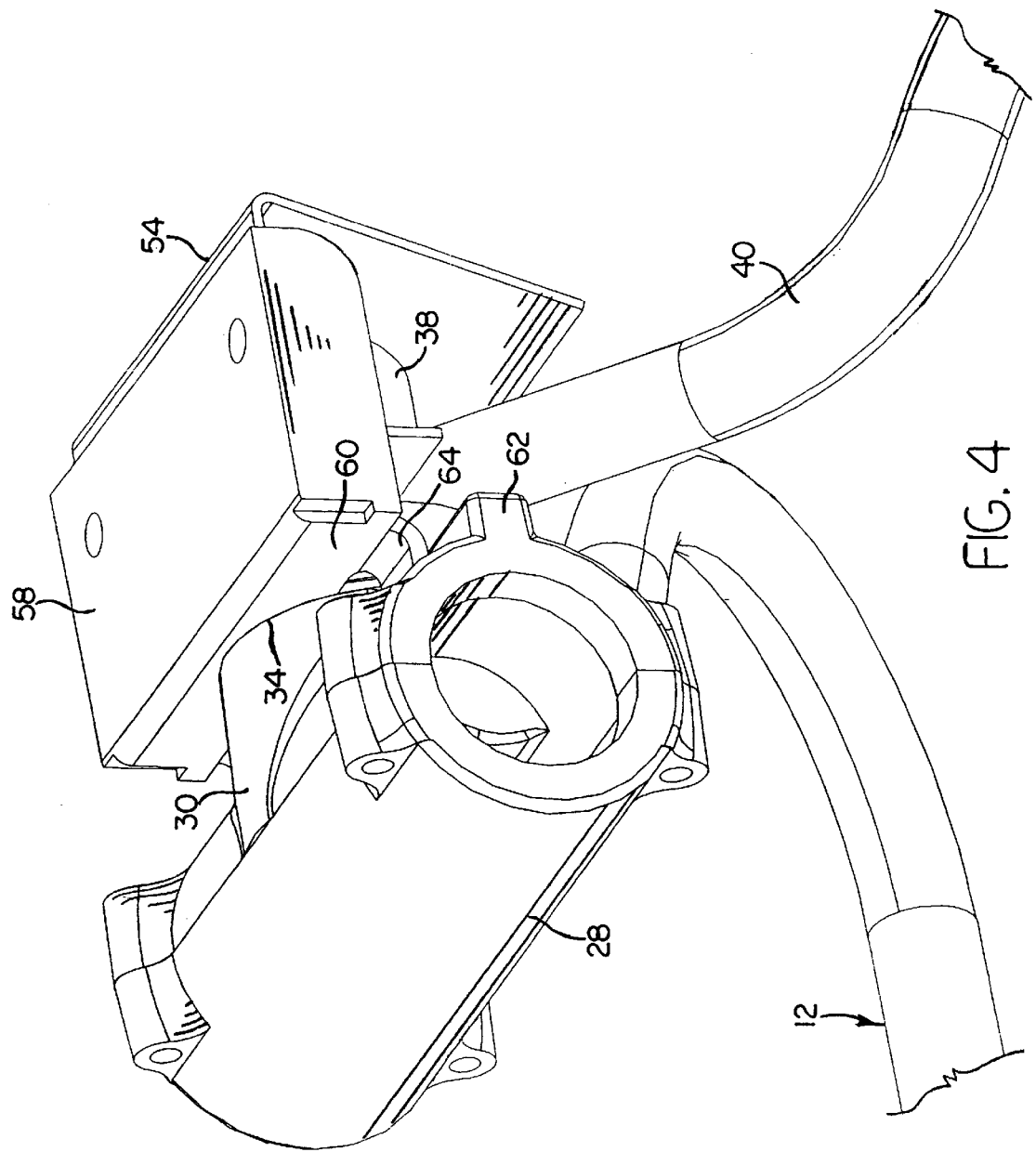
FIG. 4 is a fragmentary perspective view showing the pivot yoke of the baker connected to the baker base.

A T-shaped bracket or yoke 28, shown in two parts for ease of assembly, enclose and journal the oppositely protruding ends of pintles 24. The parts of yoke 28 are held together by suitable screws or similar fasteners. The laterally projecting leg 30 of yoke 28 is provided with a center bore 32 which extends into the hollow interior of the yoke. An annular groove 34 extends about leg 30 of the yoke and is inwardly spaced from the end face 36 of leg 30. Base 12 at its aft or rear end includes a horizontally positioned tube 38 which extends both forwardly and rearwardly relative to the converging vertical frame parts 40 of the base. Tube 38 protrudes into bore 32 of yoke 28 and forms a fixed pivot or journal about which shell members 14 and 16 are rotated during the cooking process. Base 12 includes at its forward end a U-shaped support 42 which cradles the handles 20 of shell members 14 and 16 so as to locate at least the lower shell member in a horizontal position such as shown in FIG. 3.

Figure 13:
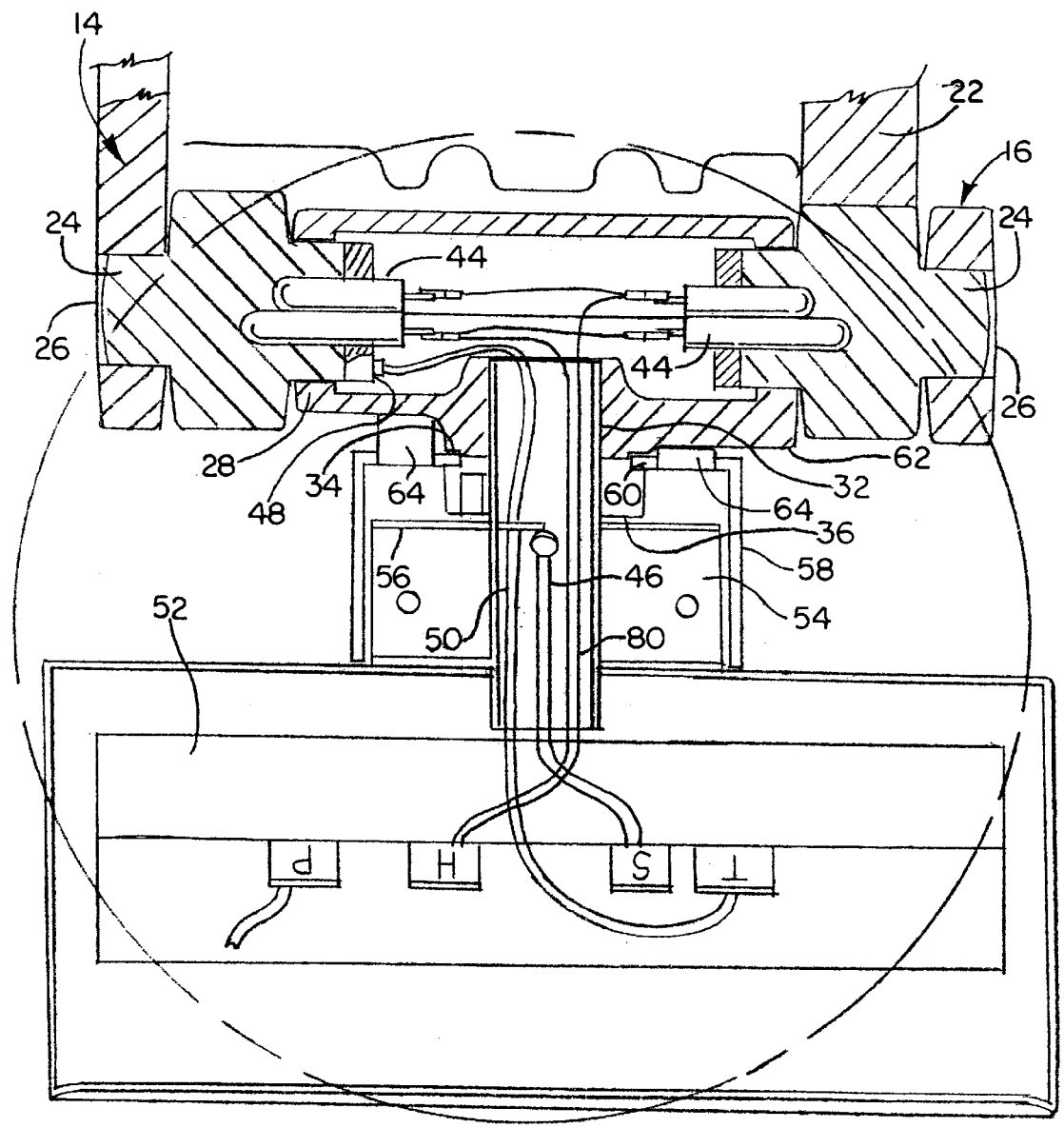
FIG. 13 is a fragmentary cross-sectional view through the yoke/shell member pivot connection and pivot tube illustrating the electrical connections from the heating elements to the control panel.

Each shell member 14, 16 includes a heater coil 44 which is connected to a power source through wiring 46 passing through the interior of yoke 28 and tube 38. A thermocouple 48 is placed in one of the shell members 14, 16 and is connected by wiring 50 (see FIG. 13) through the interiors of yoke 28 and tube 38 to a control panel 52. Thermocouple 48 serves to monitor the heat index of shell members 14, 16, thus regulating the power applied to the heating coils which in turn affects the temperature of the coils and cooking temperature of the shell members.

Figure 5:
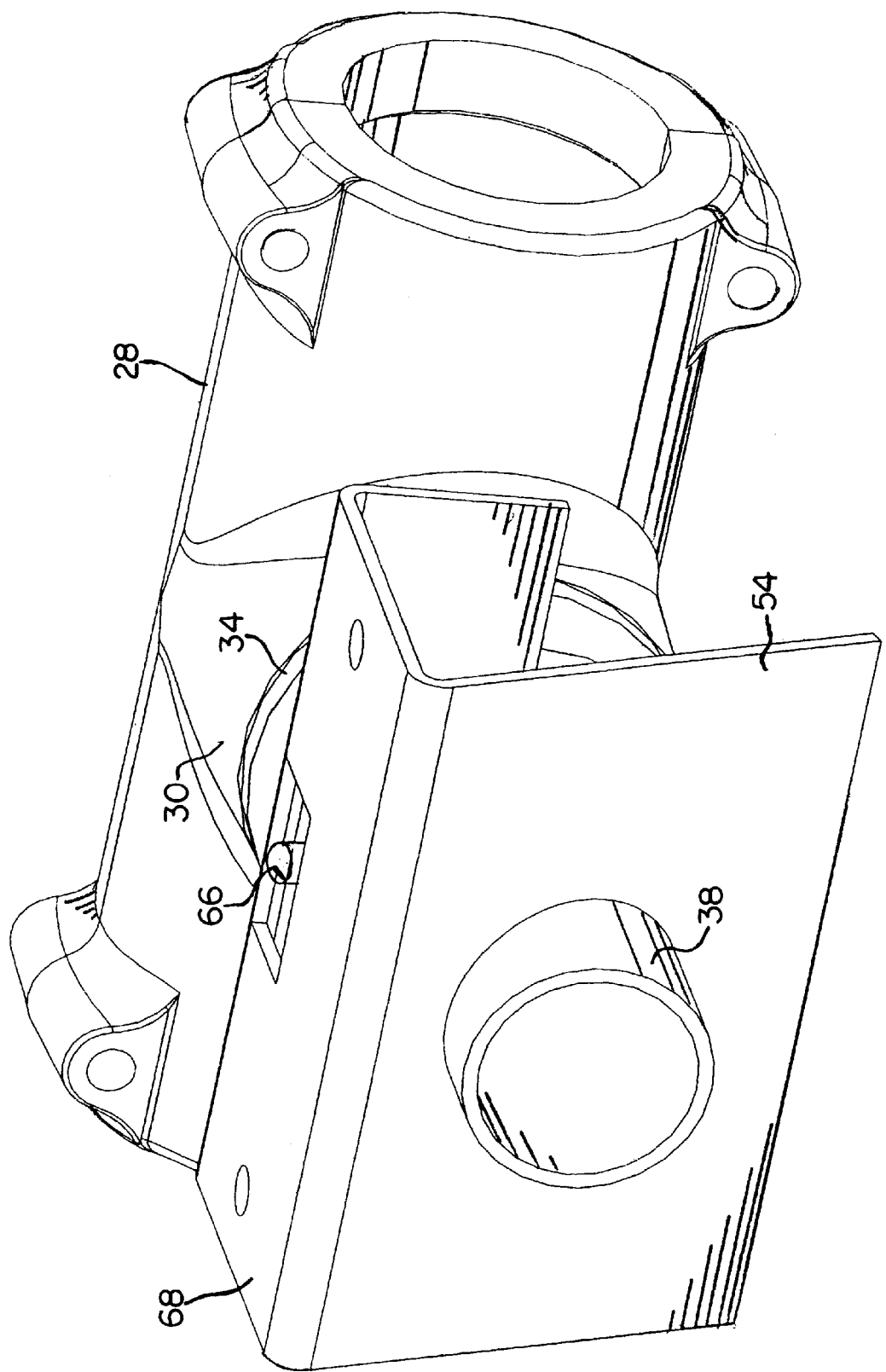
FIG. 5 is an isolated view of the pivot yoke and the pivot tube separated from the base of the baker.
Figure 6:
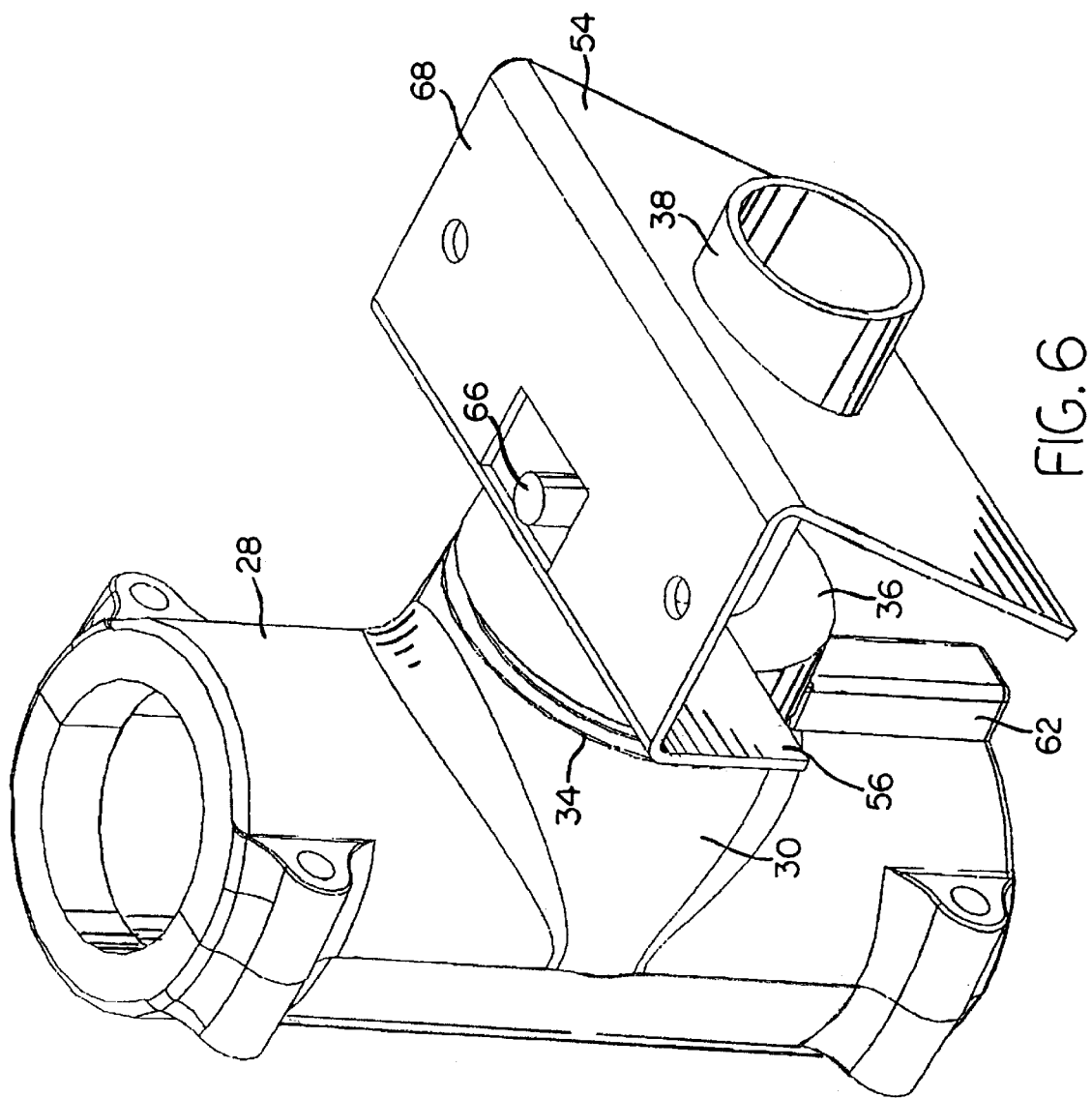
FIG. 6 is a perspective view showing the yoke rotated into a vertical orientation about the pivot tube.
Figure 7:
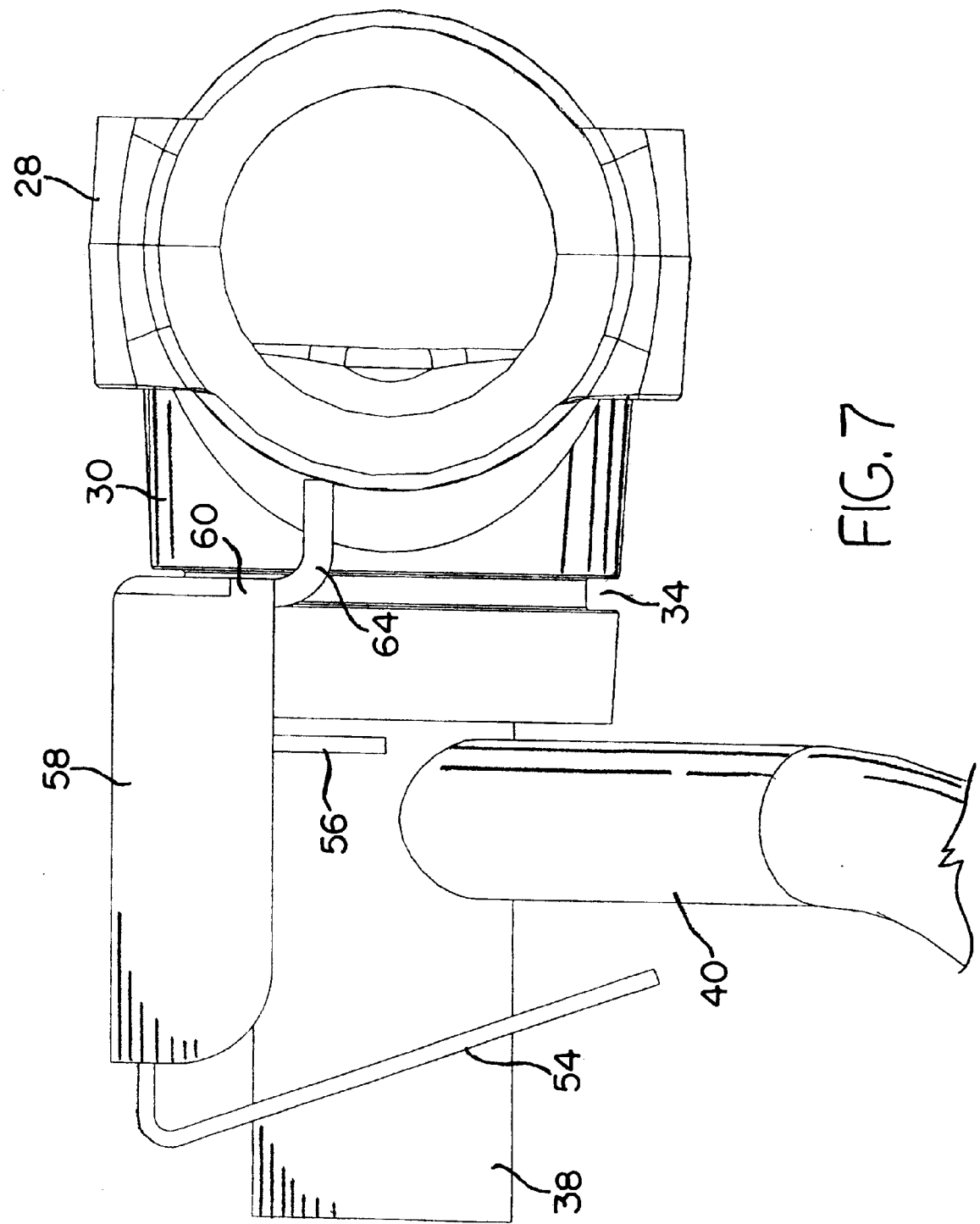
FIG. 7 is a fragmentary side view showing, the pivot yoke journaled about the pivot tube connected to the base with a retainer plate interconnecting the yoke to the tube for relative rotational movement.
Figure 8:
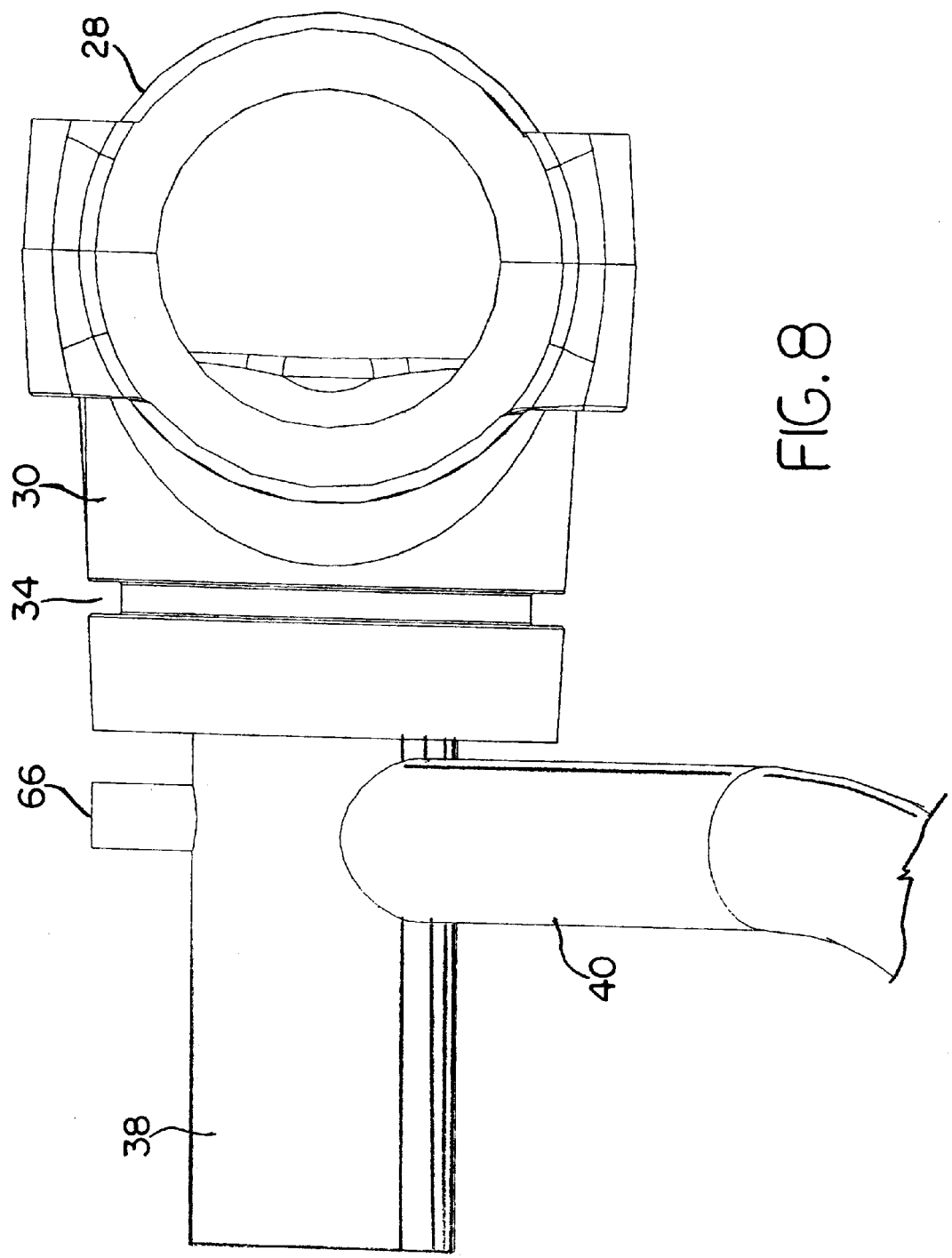
FIG. 8 is a partial side view like FIG. 7 but with the retainer plate and housing plate removed to expose the pivot tube and yoke.
Figure 9:
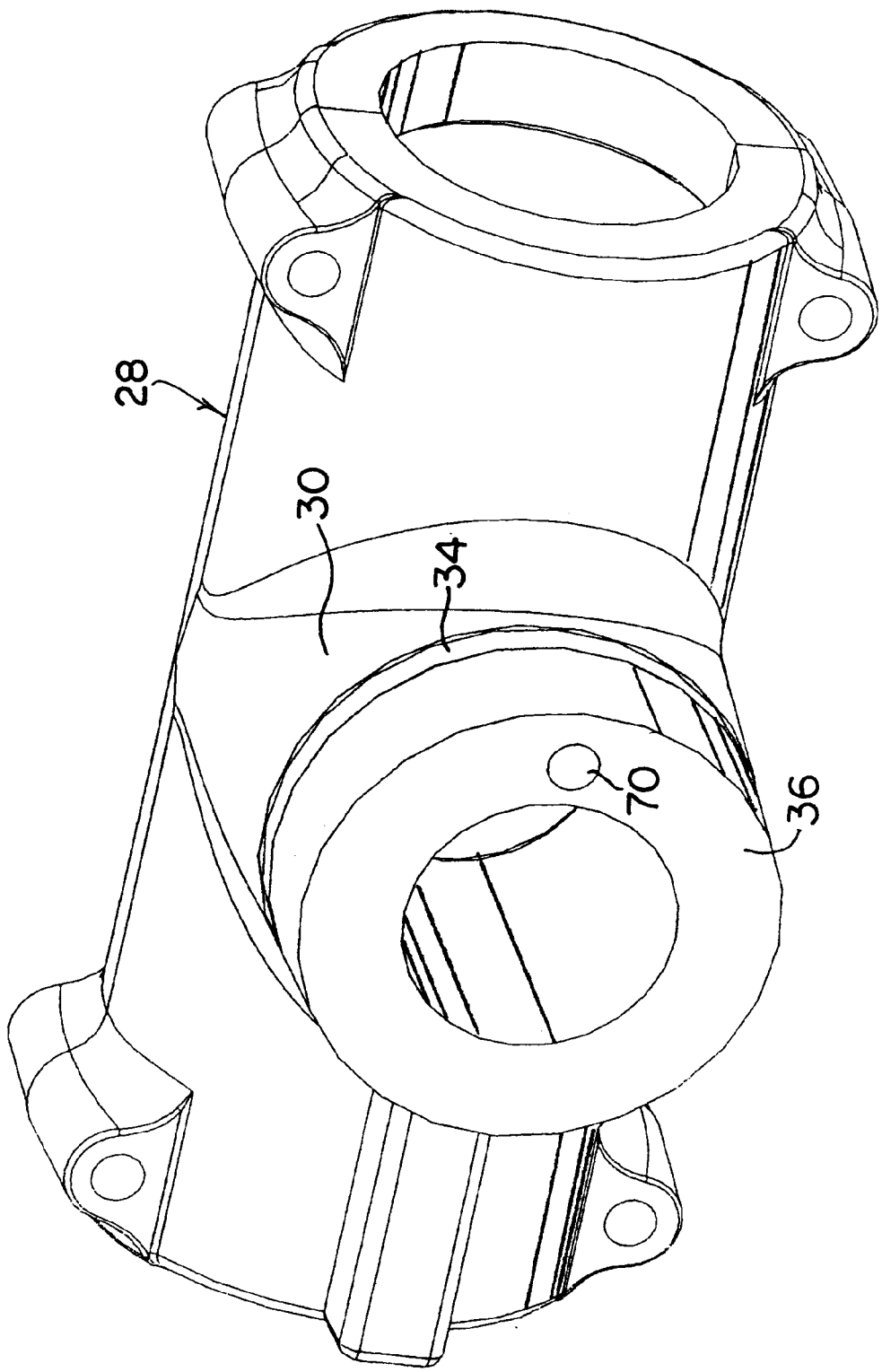
FIG. 9 is an isolated perspective view of the pivot yoke.
Figure 10:
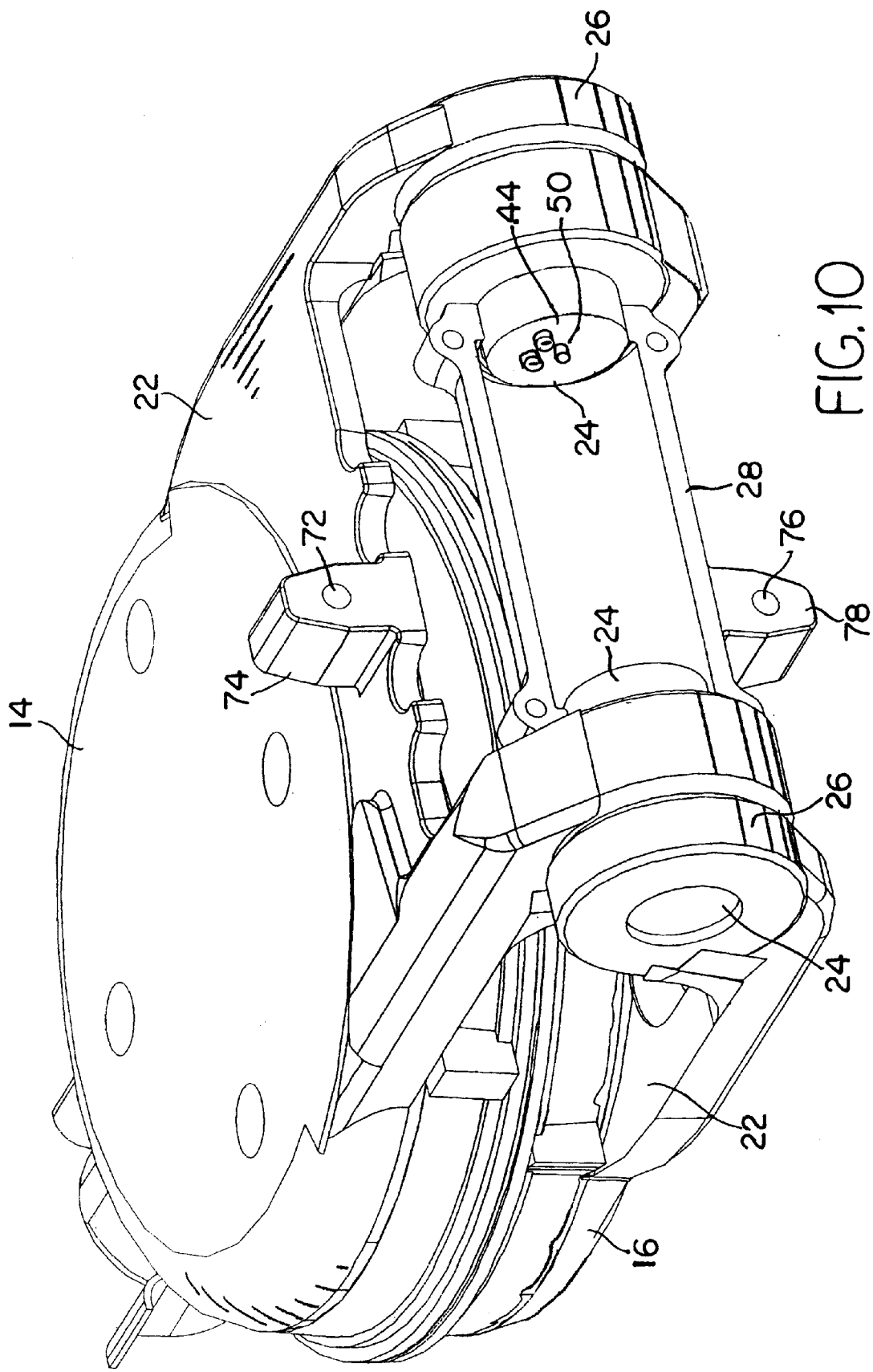
FIG. 10 is a partial perspective view showing the baker with the pivot yoke partially disassembled to expose the pinion pivots of the baker shell members.
Figure 11:
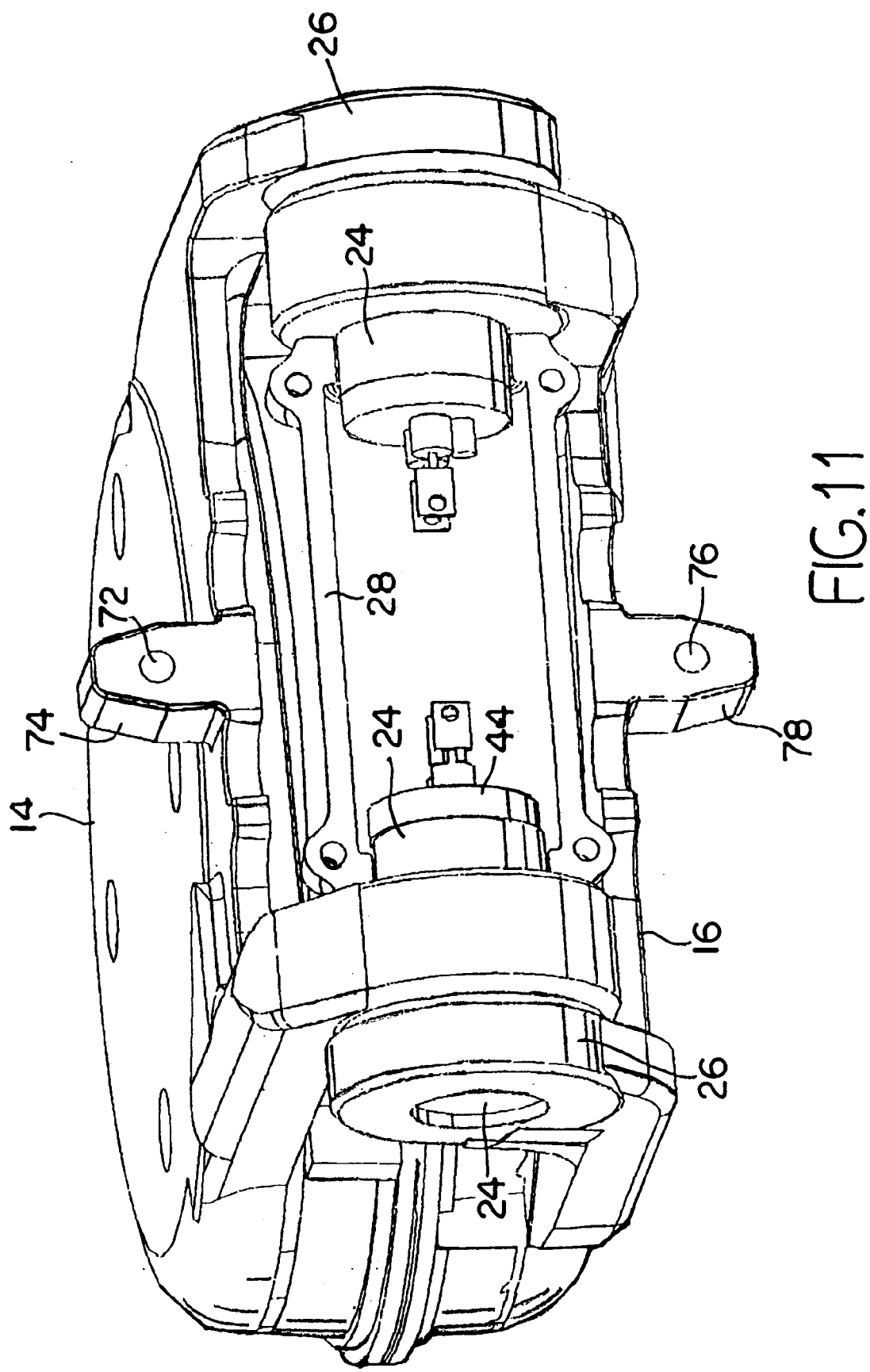
FIG. 11 is a perspective view similar to FIG. 10 but showing the electrical connections for the heating elements carried within the shell members.
Figure 12:
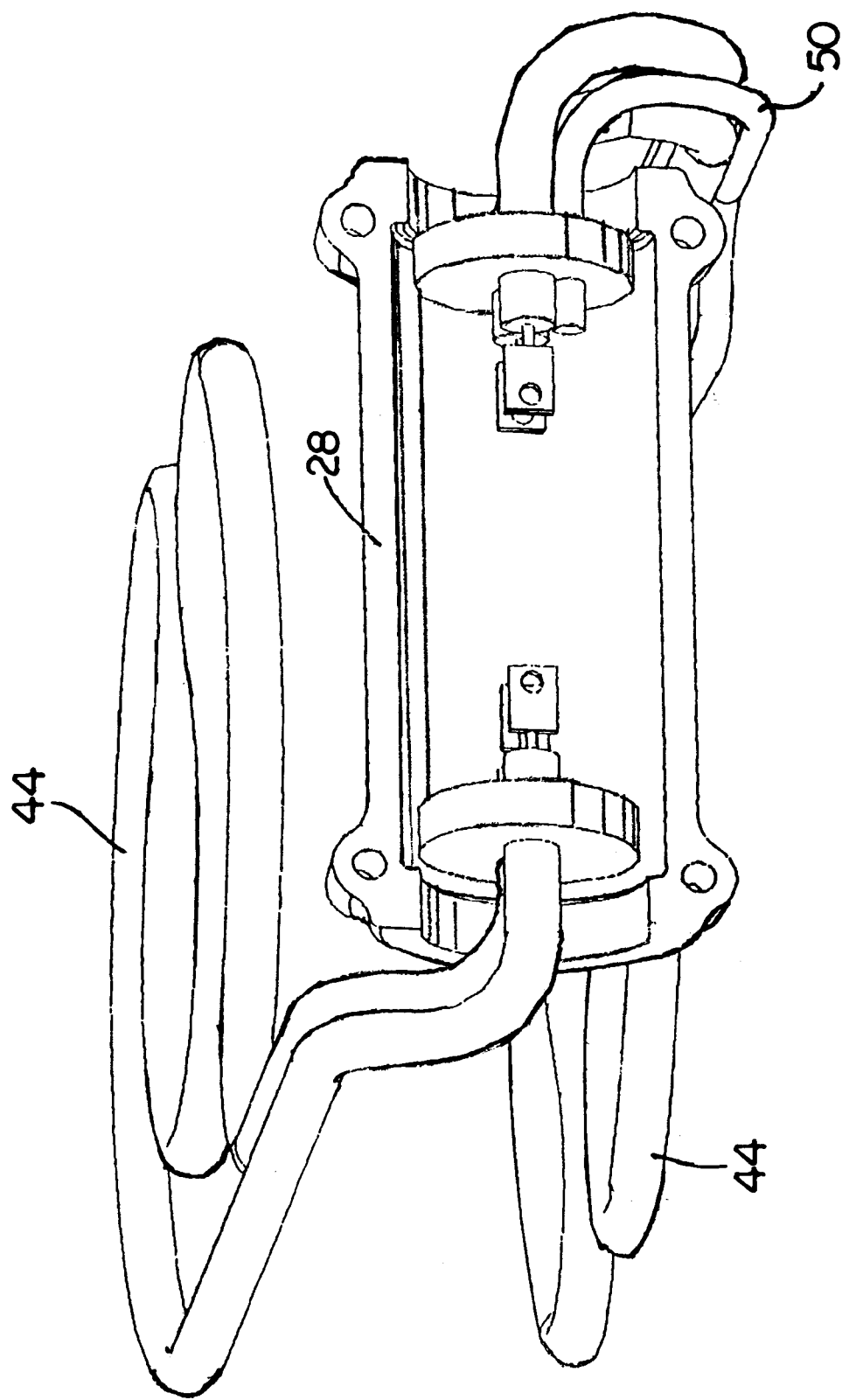
FIG. 12 is an isolated perspective view showing the heating elements housed within each of the shell members in isolated form.
Figure 12A:
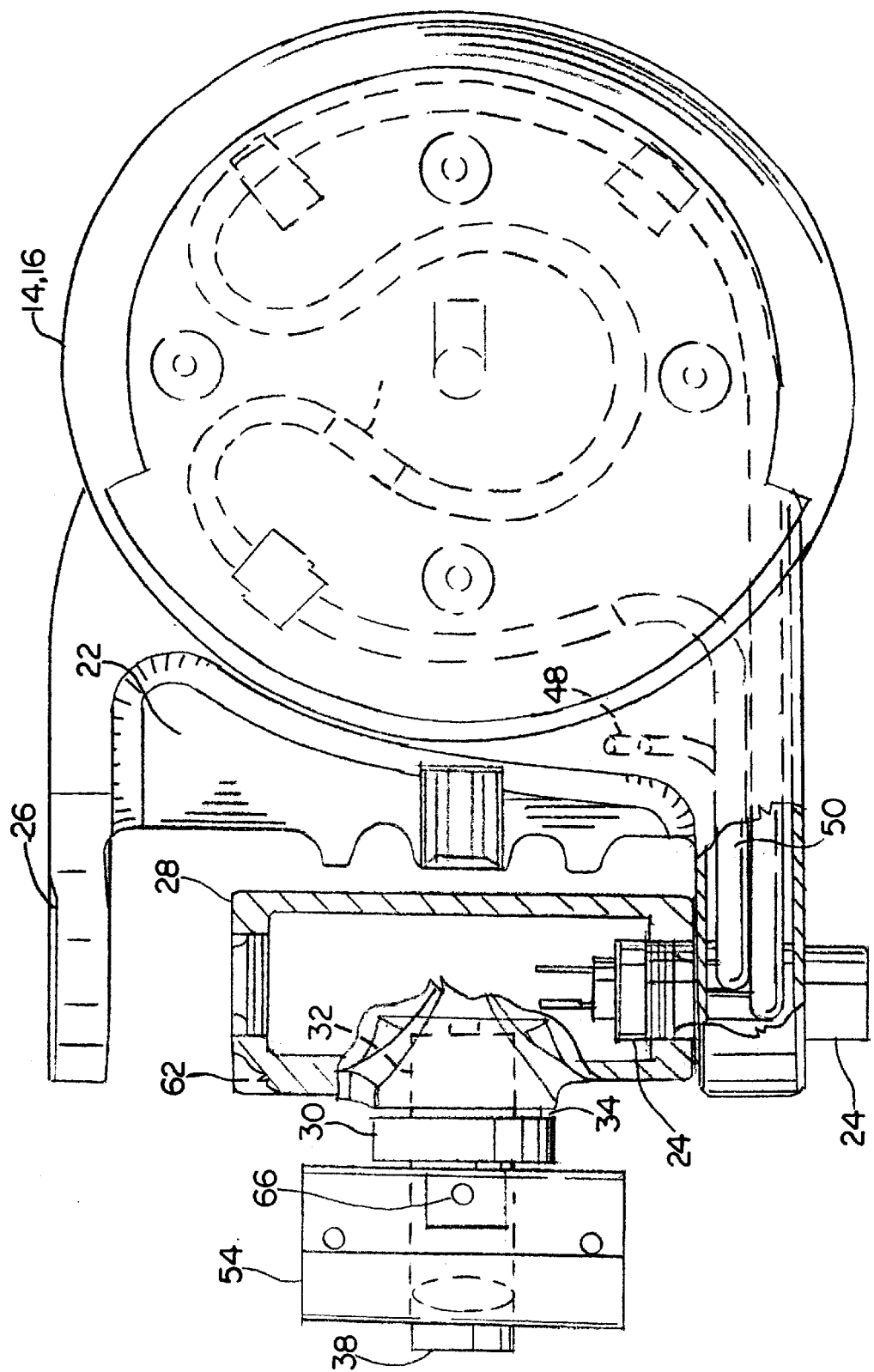
FIG. 12A is a fragmentary plan view of one shell member of the baker shown in conjunction with the pivot yoke and pivot tube illustrating the location in broken lines of the heating element, with the remaining shell member being of like form as a mirror image.

A housing plate 54, as best shown in FIGS. 5 and 6, is applied over and secured to the rearwardly protruding end of tube 38. The forward flange 56 of plate 54 is located just adjacently rearwardly of end face 36 of yoke leg 30. A retainer plate 58 overlies and is mounted to housing plate 54 such as by screws or similar fasteners. Retainer plate 58 includes a front-depending flange 60 which extends with slight clearance into the annular groove 34 about yoke leg 30 as best shown in FIGS. 1 and 7. In this manner, shell members 14, 16 and attached yoke 38 are prevented from being withdrawn from tube 38 yet allowed to rotate about the tube. In order to protect the wiring of 46, 50 from becoming twisted during rotative movement of shell members 14, 16 relative to base 12, a rib 62 carried upon and forming a part of yoke 28 is provided. In turn, retainer plate 58 includes two tabs 64 which project forwardly from the lower edge of its flange 60. Tabs 64 are located at generally diametrical locations on opposite sides of yoke leg 30 and act as stops which are contacted by rib 62 of the yoke as shell members 14, 16 are rotated upon base 12 about tube 38. In this manner, the shell members when in their closed position as illustrated in FIG. 1 are limited to rotative movement of 180° relative to base 12 which serves to limit the twisting movement applied to the wiring 46, 50.

Figure 14:
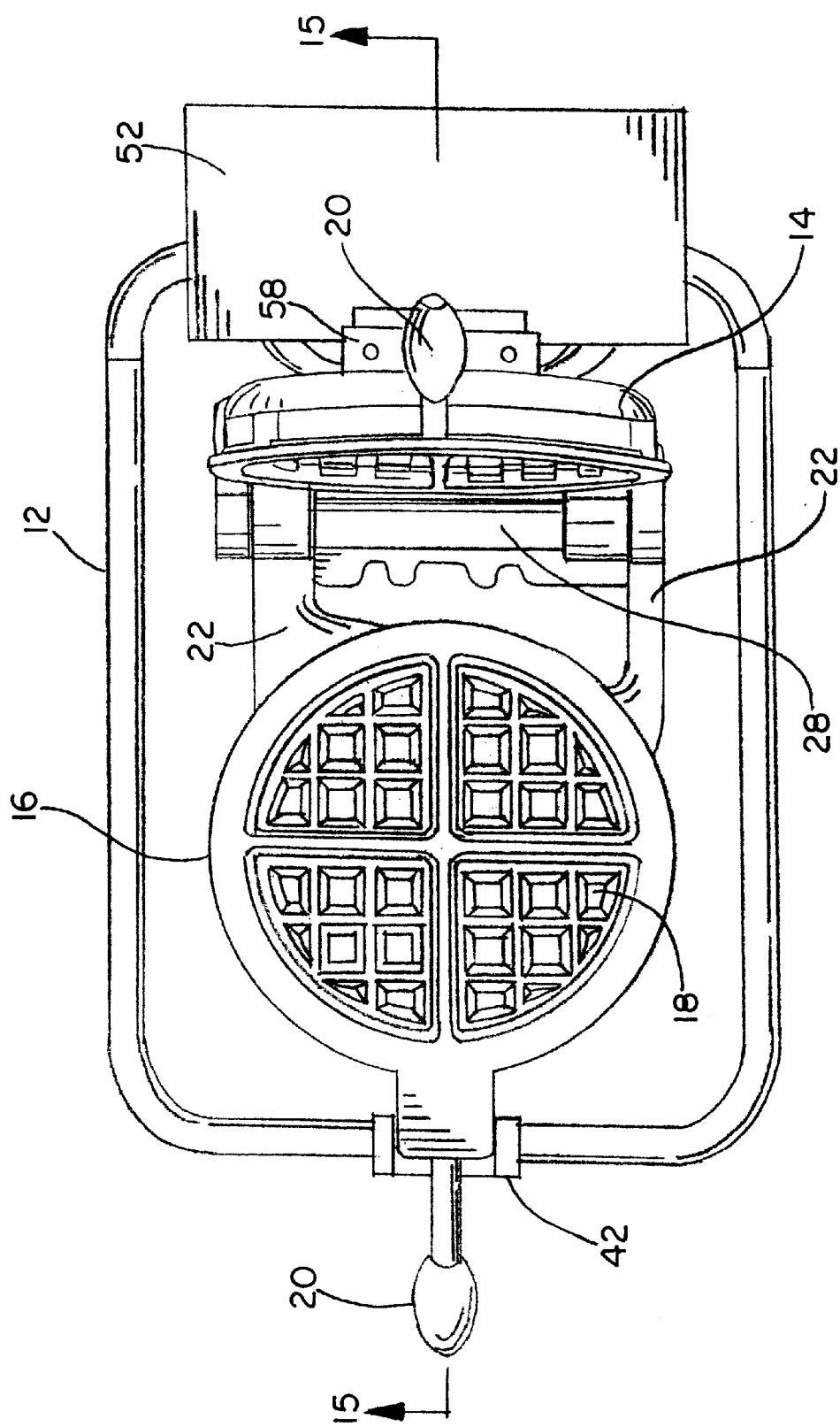
FIG. 14 is a top plan view of the baker showing the upper shell member being raised.
Figure 15:
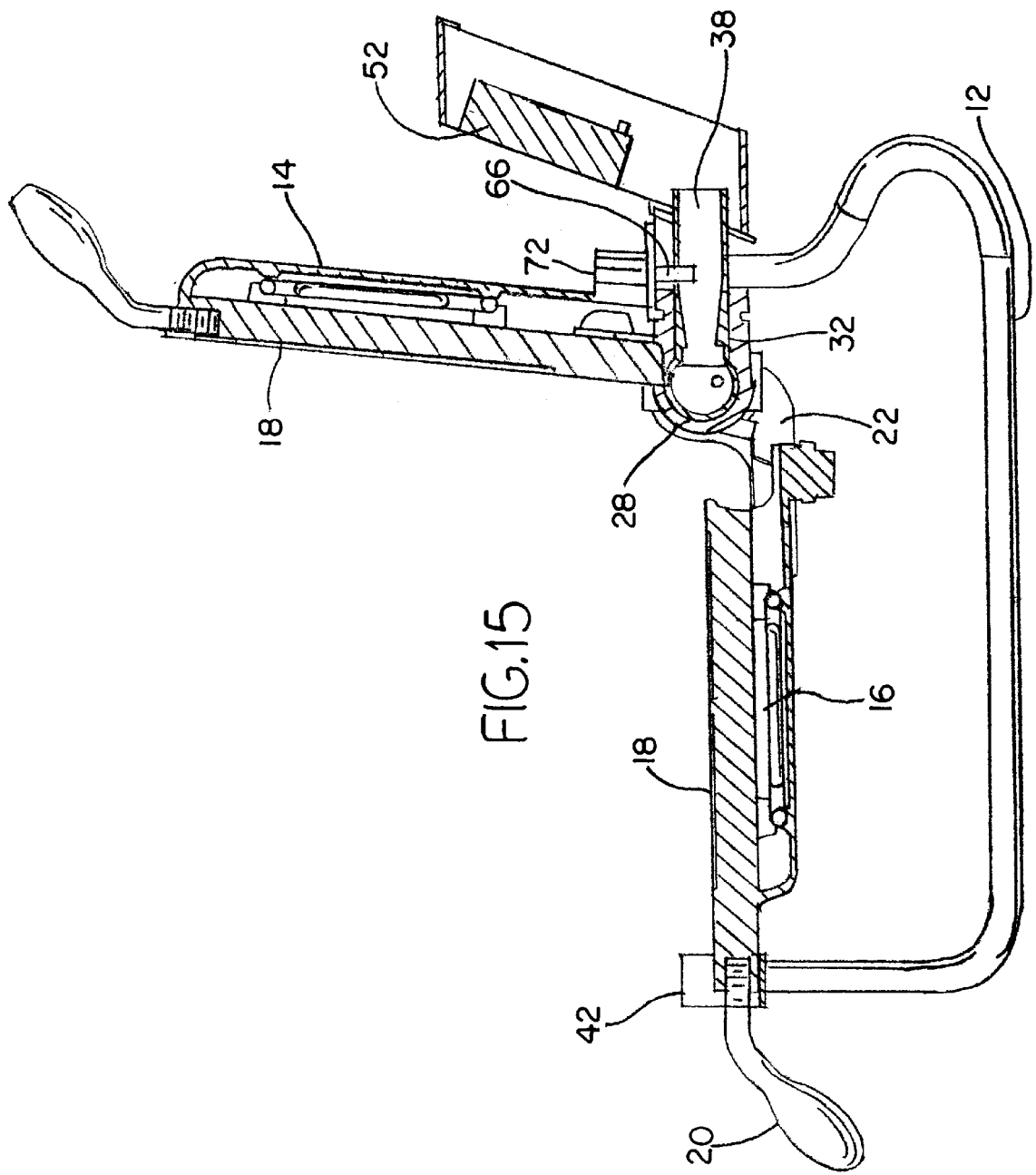
FIG. 15 is a cross-sectional view taken along line 15—15 of FIG. 14.

A magnetically responsive proximity switch, preferably of the reed type, 66 is mounted to tube 38 just rearwardly of yoke face 36 and extends to the upper surface 68 of the plate within an opening therein. Three magnets are imbedded within yoke 28 as best seen in FIG. 3. A magnet 70 is imbedded in face 36 of yoke leg 30 at a diametrical side location so that it will pass switch 66 once upon each 180° rotation of the shell members relative to base 12. A magnet 72 is carried by an outwardly protruding stop 74 extending from shell member 14, and a magnet 76 is carried by an outwardly protruding stop 78 extending from shell member 16. Magnets 72 and 76 are so located that when the particular shell member 14, 16 is in its raised or open position such as shown in FIGS. 14 and 15, the stop 74, 78 of the shell member rests upon retainer plate 58 so as to maintain the raised shell member in its open position with the magnet 72, 76 carried by the shell member adjacently overlying switch 66. Switch 66 is connected by wiring 80 to control panel 52 through tube 38.

Figure 16:
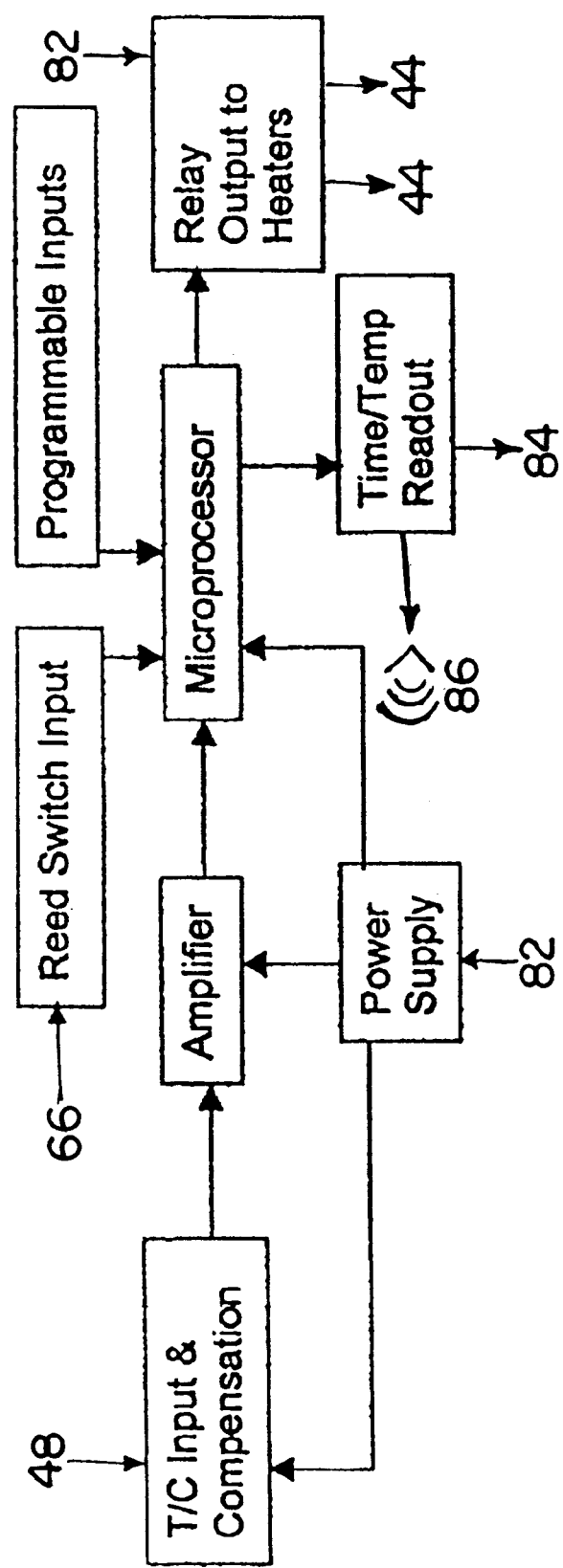
FIG. 16 is a block diagram of the control elements for the baker.

Control panel 52 which is mounted upon tube 38 rearwardly of base frame parts 40 serves to house circuitry for the heating and timing operations of baker 10. FIG. 16 is a block diagram of the circuit components for the baker. A power cord 82 is provided for connection to a suitable voltage power source. A relay connects the power source through cord 82 to coils 44. Thermocouple 48 serves to monitor the heat of shell members 14, 16 and through the microprocessor actuates the relay which controls the power input to coils 44. Proximity switch 66 through the microprocessor activates a time circuit which provides a timed readout visible at faced 84 located at the front of the control panel. Similarly, the microprocessors provide a shell member temperature readout from thermocouple 48 at face 84. In conjunction with the time and temperature readouts, an audio alarm in the form of a beeper 86 also provides an audio warning indication. Certain programmable inputs are provided the microprocessor in the nature of cooking time duration, shell member temperature, chase pattern which will be later explained, and the beeper sound duration which is usually between 0 and 30 seconds.

The operation of baker 10 is as follows. With power cord 82 inserted into an electrical receptacle, shell members 14, 16 are preheated to the desired cooking temperature inputted into the microprocessor and controlled by thermocouple 48. The uppermost shell member 14 is raised to expose concave food part 18 of the lower shell member 16 with the upper shell member being supported in its open position by its stop 74 engaging and resting upon retainer plate 58 as seen in FIG. 15. When in this position, the magnet 72 housed within stop 74 is positioned adjacently over switch 66 and the timing cycle for the baker is reset. Once the cooking batter has been placed within the lower open shell member 16, shell member 14 is immediately closed with proximity switch 66 being activated due to the lack of the magnetic influence of magnet 72 to start the chase pattern within control panel 52. If shell members 14, 16 are not rotated within a specific amount of time, such as two seconds, alarm 86 sounds to advise the user of the baker of the failure to rotate the shell members. Shell member rotation is necessary to distribute the batter within the interior of the shell members so as to promote even and desirable cooking of the food article. The chase pattern and its associated warning can be eliminated at the option of the user should the user, between cooking cycles, desire simply to rest the empty shell members in their closed positions. As the closed shell members 14. 16 are rotated, magnet 70 passes in close proximity to switch 66 by virtue of its position upon the rotating yoke 28. again activating the switch and causing the timing circuit to begin the cooking countdown.

As the cooking countdown progresses, the user may observe the countdown upon readout face 84. Again the amount of time inputted for the cooking countdown will vary depending upon the type of food product being baked. At the end of the cooking cycle when the countdown is timed out, another audio sound is emitted by buzzer 86 indicating to the user that the cooking cycle is finished and that the now upper shell member 16 should be lifted and placed in its open position so as to allow the removal of the cooked food item. Buzzer 86 preferably continues sounding at the finish of the cooking cycle until the upper shell member is raised by the user of the baker. With shell member 16 now in its open position, its magnet 76 is located adjacently over switch 66 so as to place the cooking cycle in its reset mode. Once new batter has been placed in the concave food part 18 of now lower shell member 14, upper shell member 16 can be closed to again cause activation of the switch 66 and the operation of the chase mode to warn the user to rotate the closed shell members within the specific time period. Again, as previously described upon rotation of closed shell members 14, 16, magnet 70 in passing switch 66 causes activation of the cooking timer with its countdown as previously described.

The invention is not to be limited to the details above given but may be modified within the scope of the appended claims.

What is claimed is:

1. A baker for waffles, pancakes and similar food items, said baker including first and second shell members each having a hinge part and a concave food receiving part, said shell members having their respective hinge parts in a cooperating relationship and being pivotal about a first axis between a closed position in which said food receiving parts confront one another and an open position in which the shell members are separated, a base, said base including means for supporting said shell members for rotation as a unit about a second axis when in their said closed position, a yoke engaging each shell member hinge part for supporting the shell members and accommodating pivotal movement of said shell members between said open and closed positions, said yoke supported by said base and being rotatable with said shell members as the shell members are rotated about said second axis of rotation, a sensor carried by said base, an actuator carried by at least one of said yoke and a said shell member, said actuator constituting means for actuating said sensor upon said shell members being rotated about said second axis of rotation, said sensor when actuated for starting a timer indicative of the cooking cycle of said baker.

2. The baker of claim 1 wherein said actuator is carried by said yoke.

3. The baker of claim 2 and a second actuator carried by each of said shell members, each of said second actuators constituting means for actuating said sensor when said shell members are shifted between said open position into said closed position, said sensor constituting, means for actuating an alarm indicative of the need to rotate said closed shell members about said second axis of rotation.

4. A baker for waffles, pancakes and similar food items, said baker including first and second shell members each having a hinge part and a concave food receiving part, said shell members having their respective hinge parts in a cooperating relationship and being pivotal about a first axis between a closed position in which said food receiving parts confront one another and an open position in which the shell members are separated, a base, said base including means for supporting said shell members for rotation as a unit about a second axis when in their said closed position, a yoke engaging each shell member hinge part for supporting the shell members and accommodating pivotal movement of said shell members between said open and closed positions, said yoke supported by said base and being rotatable with said shell members as the shell members are rotated about said second axis of rotation, said yoke having an opening extending, oppositely of said shell members, said base including a tubular member, said tubular member extending into said yoke opening to form a journaled support for said shell members when rotated about said second axis of rotation.

5. The baker of claim 4 and a retainer part carried by said base and engaging said yoke to prevent said tubular member from being withdrawn from said yoke opening.

6. The baker of claim 5 wherein said yoke has an annular groove equal radially extending about said second axis of rotation, said retainer part extending into said groove.

* * * * *